United States Patent [19]
Kabler et al.

[11] Patent Number: 6,128,515
[45] Date of Patent: Oct. 3, 2000

[54] COMBINED GLOBAL POSITIONING AND WIRELESS TELEPHONE DEVICE

[75] Inventors: Ronald B. Kabler, Olathe; Robert M. Kalis, Prairie Village; Dale R. Langner, Overland Park, all of Kans.

[73] Assignee: Garmin Corporation, Taiwan

[21] Appl. No.: 09/032,329

[22] Filed: Feb. 27, 1998

[51] Int. Cl.[7] ........................................ H04B 1/38
[52] U.S. Cl. ........................ 455/566; 455/575; 455/90
[58] Field of Search ............................ 455/556, 575, 455/90, 557, 566; 340/825.49

[56] References Cited

U.S. PATENT DOCUMENTS

| | | | |
|---|---|---|---|
| 4,903,325 | 2/1990 | Yoshitake et al. | 455/575 |
| 5,230,016 | 7/1993 | Yasuda | 455/573 |
| 5,461,365 | 10/1995 | Schlager et al. | 340/573 |
| 5,610,971 | 3/1997 | Vandivier | 455/569 |
| 5,650,770 | 7/1997 | Schlager et al. | 340/573 |
| 5,711,013 | 1/1998 | Collett et al. | 455/558 |
| 5,786,789 | 7/1998 | Janky | 342/357.1 |
| 5,877,724 | 3/1999 | Davis | 342/357.1 |
| 5,889,474 | 3/1999 | LaDue | 340/825.49 |
| 5,956,655 | 9/1999 | Suzuki et al. | 455/566 |

FOREIGN PATENT DOCUMENTS

535903 A1  9/1992  Japan ................ H04B 1/38

*Primary Examiner*—Fan Tsang
*Assistant Examiner*—Blane J. Jackson
*Attorney, Agent, or Firm*—Shook Hardy & Bacon

[57] ABSTRACT

An ergonomic hand held combined global positioning wireless telephone device utilizes a unique arrangement of components to minimize the size and especially the length of the device housing. To that end, a keypad and a display are positioned on a control face of the device while an ear piece and a mouth piece are positioned on an audio face which is opposite the control face. Further, a GPS board is angled with respect to the housing to provide additional space for a battery pack latching mechanism, a GPS antenna, and a speaker.

15 Claims, 3 Drawing Sheets

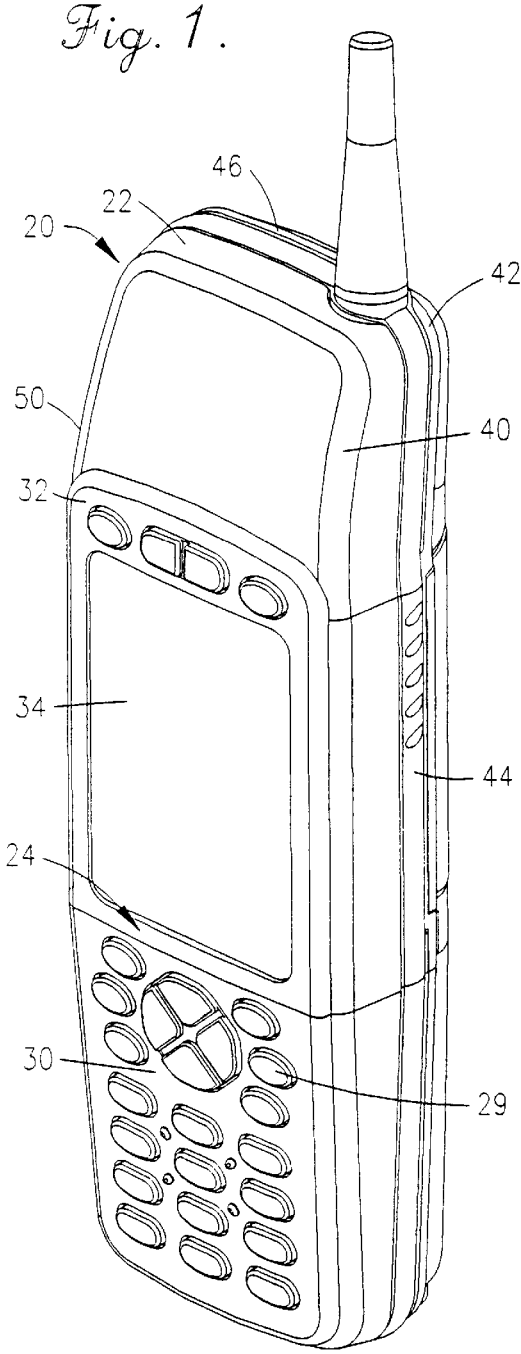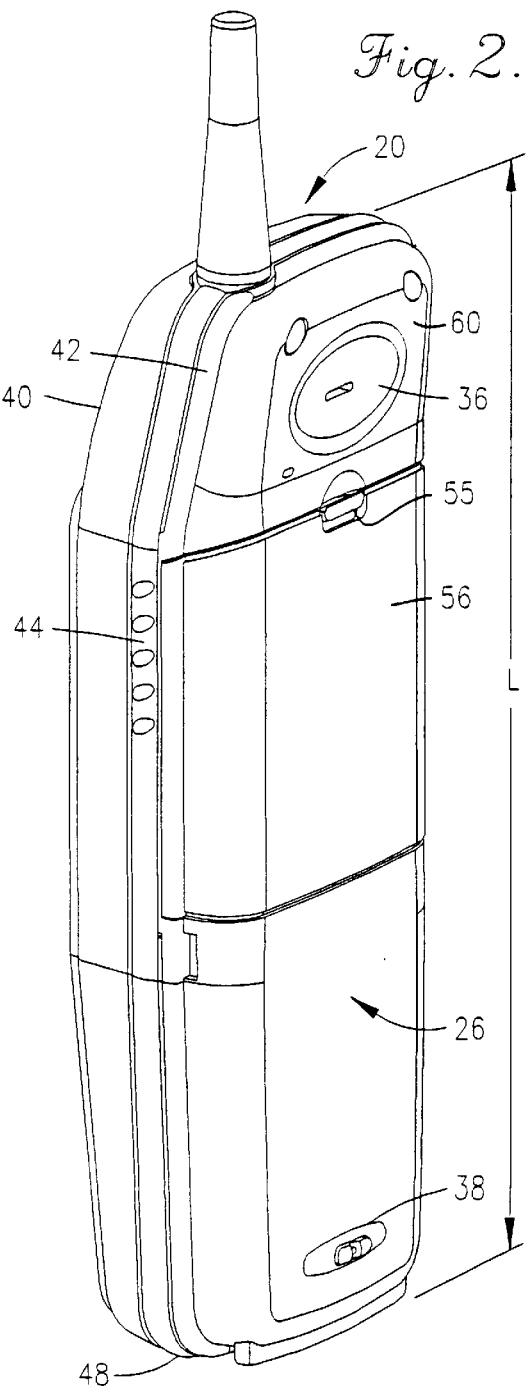

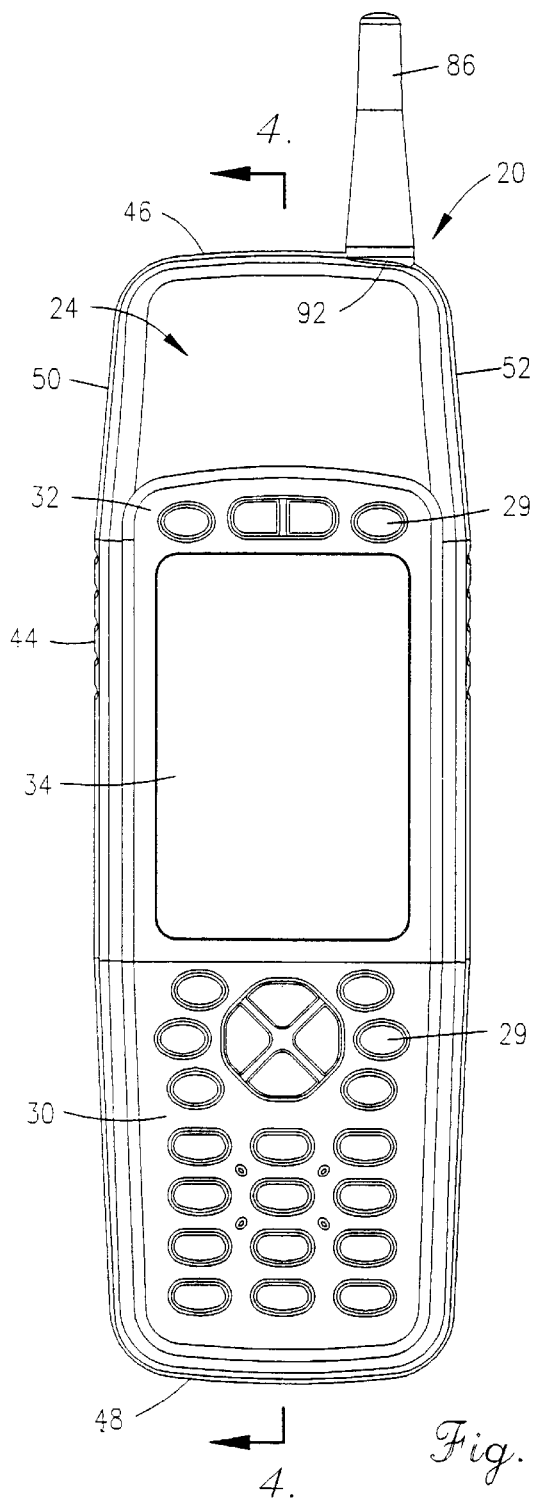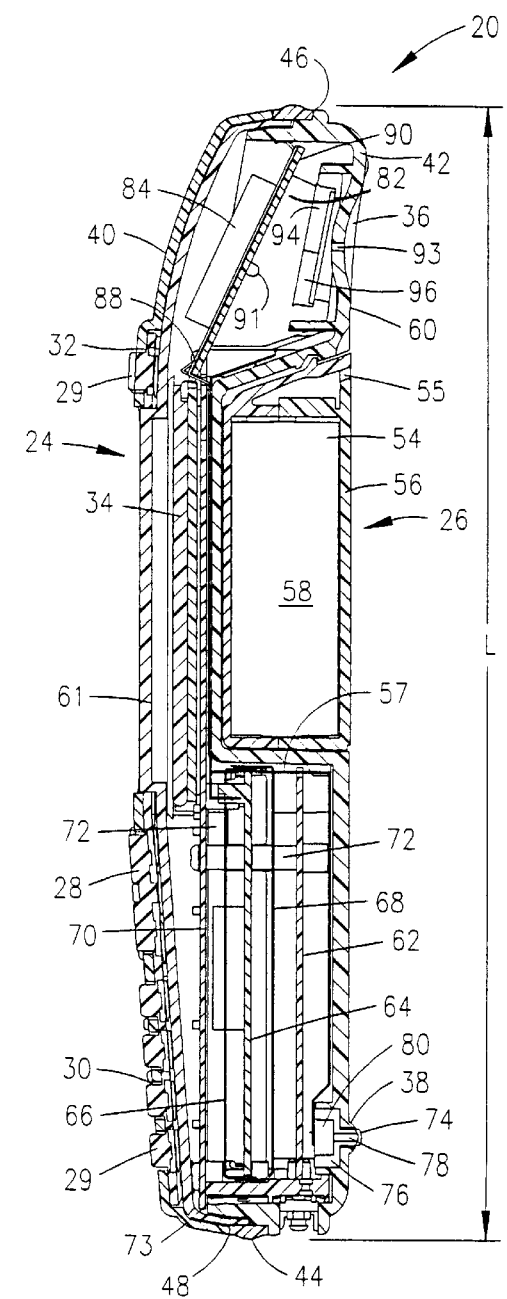
Fig. 3.
Fig. 4.

COMBINED GLOBAL POSITIONING AND WIRELESS TELEPHONE DEVICE

BACKGROUND OF THE INVENTION

This invention relates to a combined global positioning and wireless telephone device and, more particularly, to a combined global positioning and wireless telephone device with components arranged to minimize size.

Wireless telephones, such as cellular phones, have become commonplace in our technologically advanced society, and with recent advances in satellite and global positioning technologies, global positioning systems (GPS) are being used with increasing frequency. The increasing use of both wireless telephones and global positioning systems has lead to the combined use of the two systems as taught by U.S. Pat. Nos. 5,555,286 to Tendler; 5,365,450 to Schuchman et al.; 5,043,736 to Darnell et al.; 5,301,368 to Hirata; and 5,235,633 to Dennison et al. These references deal generally with how the systems can be used together. For example, Dennison et al. teach cell site selection in a cellular telephone system based on a position of a mobile unit obtained by a global positioning system, and Tendler teaches an emergency message transmission by a cellular telephone which includes a position determined by a global positioning system.

These references, however, do not address the need for an ergonomic device including both a wireless telephone and a global positioning system combined in a comfortable hand held size. As illustrated in the devices of Dennison et al. and Tendler, ear and mouth pieces are located on the same face of the devices as control panels and displays. To have enough room for speakers and microphones which accompany the ear pieces and mouth pieces, the devices must be made undesirably long or include a hinged flap which adds undesirable complexity. Further, these references teach nothing regarding the internal arrangement of the components of the device. If the device is too large, it is unwieldy to hold and use, and the ear and mouth pieces may be spaced too far apart for some users. Further, increased size typically means increased weight, making the device less comfortable to hold and use.

Thus, minimizing the size of combined global positioning and wireless telephone devices is desirable to enhance the ergonomics of the devices and make them more comfortable to hold.

BRIEF SUMMARY OF THE INVENTION

There is, therefore, provided in one embodiment of the invention a novel combined global positioning and wireless telephone device having a unique arrangement of components to minimize the size, and especially the length, of the device. The device has a control face with a display and keypad positioned thereon. An ear piece and a mouth piece are positioned on an audio face of the device opposite the control face to minimize the length of the device and optimize the spacing between the ear piece and the mouth piece. The device also preferably includes an angled GPS board to minimize length and make space for other components of the device.

In a preferred embodiment, the ear piece is positioned opposite a GPS patch antenna, and the mouth piece is positioned opposite a main portion of the keypad. Further, the display is positioned centrally on the control face, and a battery compartment, which opens on the audio face, is positioned between the ear and mouth pieces opposite the display.

Accordingly, it is an object of the present invention to provide an improved global positioning and wireless telephone device with a unique arrangement of components which minimizes the size of the device.

It is a further object of the present invention to provide an improved global positioning and wireless telephone device which is more compact and comfortable to hold in a user's hand.

BRIEF DESCRIPTION OF THE DRAWINGS

These and other features, advantages, and objects will appear from the following detailed description when considered in connection with the accompanying drawings in which similar reference characters denote similar elements throughout the several views and wherein:

FIG. 1 is a front perspective view of an ergonomic hand held combined global positioning and wireless telephone device according to the present invention;

FIG. 2 is a rear perspective view of the ergonomic hand held combined global positioning and wireless telephone device of FIG. 1;

FIG. 3 is a front elevational view of the ergonomic hand held combined global positioning and wireless telephone device of FIG. 1;

FIG. 4 is a cross sectional view of the ergonomic hand held combined global positioning and wireless telephone device of FIG. 1 taken along line 4—4 of FIG. 3.

DETAILED DESCRIPTION OF THE PREFERRED EMBODIMENTS

Figure 5:
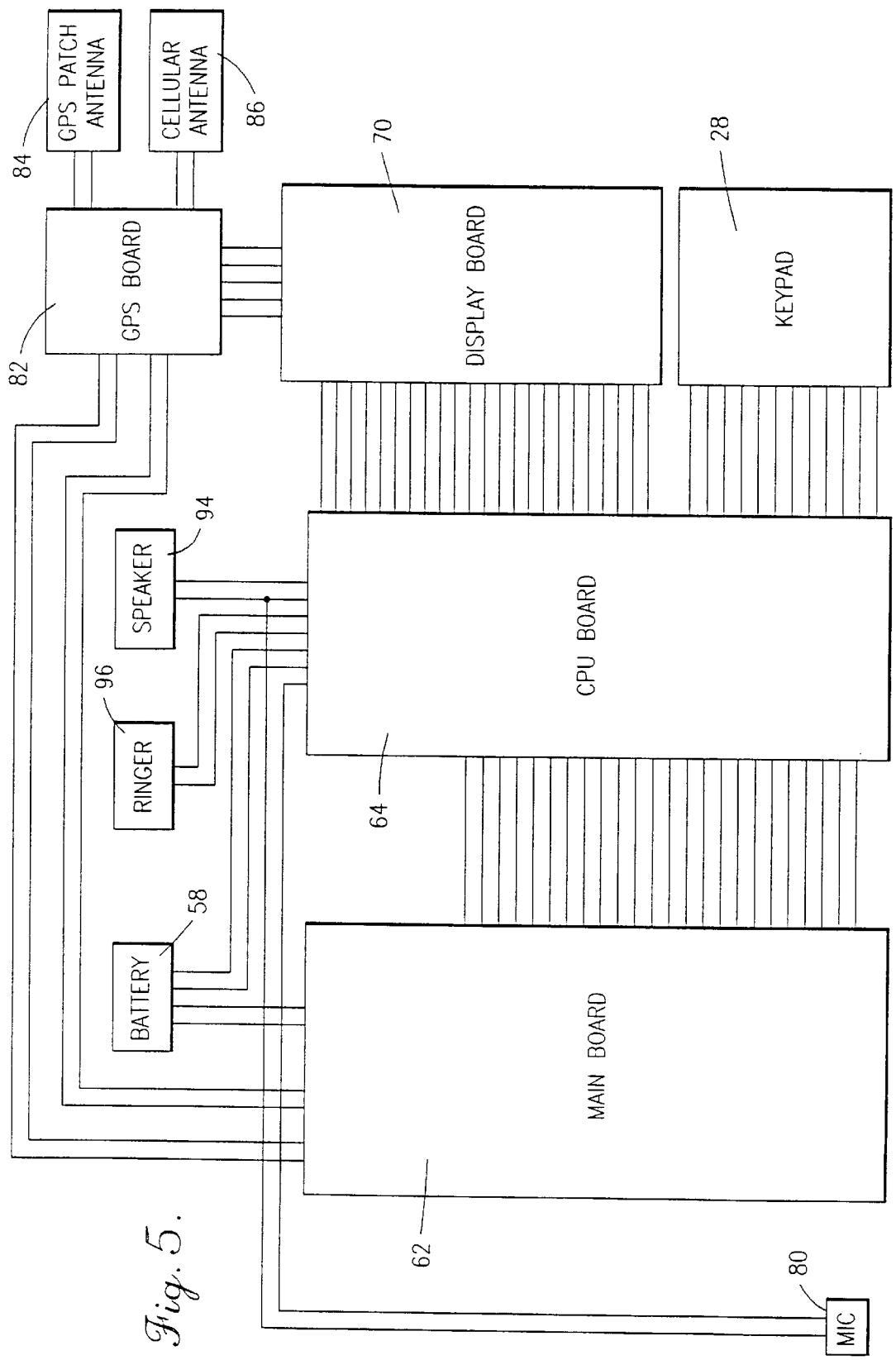
FIG. 5 is a circuitry block diagram for the combined global positioning and wireless telephone device of FIG. 1.

Referring to the drawings in greater detail, FIGS. 1, 2, and 3 show a combined global positioning and wireless telephone device of the present invention, generally designated by reference numeral 20. Preferably, the wireless telephone system is cellular, although may alternatively utilize other technologies, such as VHF or digital, including PCS. The device has a generally rectangular housing 22 with a control face 24 and an audio face 26 opposite the control face 24. The control face 24 includes an input keypad 28 (FIG. 4) which has keys 29, a main input pad area 30, and a smaller secondary input pad area 32. An LCD display 34 is positioned on the control face 24 between the main input pad area 30 and the secondary input pad area 32. The audio face 26, which is opposite the control face 24, has an ear piece 36 and a mouth piece 38. By locating the ear piece 36 and the mouth piece 38 on the audio face 26 opposite the control face 24, the size, especially the length L (FIG. 2), of the device 20 is minimized.

The housing 22 has an outer front case 40 interfittingly connected to a rear case 42. A circumferential bumper 44, made of a resilient material, surrounds and covers the connection between the outer front case 40 and the rear case 42. The outer front case 40 defines the control face 24, and the rear case 42 defines the audio face 26. The combination of the front and rear cases defines a housing top 46, a housing bottom 48, and two housing sides 50, 52. The top, bottom, and sides separate the opposing audio and control faces and can be planar, but preferably, they are slightly rounded to make the housing more comfortable to hold. The housing can also be formed with only one side, so that the housing has a generally triangular cross-sectional configuration with the audio and control faces still being substantially opposite.

In a preferred embodiment, the audio face 26 comprises the rear inner face, and the control face comprises the front outer face. The surface of the rear inner face in the vicinity of the rear piece 36 is formed with a large radius concave curve 60. The curve is included so that the device approximates the shape of a typical operator's face from ear to mouth. Alternatively or additionally, the housing 22 can curve adjacent the mouth piece 38.

Referring additionally to FIG. 4, as previously noted, the ear piece 36 and mouth piece 38 are positioned on the audio face 26. A battery compartment 54 is positioned between the ear and mouth pieces with a battery pack 56 filling an opening on the audio face 26. Thus, the battery cover 56 is opposite the display 34. A latching mechanism 55 is provided to hold the battery pack 56 on. Batteries 58 which are received in the compartment 54 and electrically connected to the device provide a means for powering the device. Alternatively or additionally, a socket for receiving power from an outside source is provided. Power is transmitted from the battery pack 58 to the components of the device by a thin, plate like, flex circuit 57 having many bends to thread it between components.

The internal components of the device will be described with reference to FIGS. 4 and 5. The outer front case 40 is connected to an inner front case 61, and the keypad 28 is held between the inner front case 61 and outer front case 40 with the keys 29 protruding outwardly from the outer front case 40. The remaining components, with the exception of the battery compartment 54, are held between the inner front case 61 and the rear case 42.

A main board 62 and a CPU board 64 are operatively connected and positioned adjacent to each other inside the housing behind the main input pad area 30. The keypad 28 is operatively connected to the CPU board 64. The CPU board is surrounded by front and rear CPU shields 66, 68 respectively, and the main board 62 is positioned rearwardly from the rear CPU shield 68. A display board 70, operatively connected to the CPU board 64, is positioned between the inner front casing 61 and front CPU shield 66. The display board 70 extends upwardly in the housing to a position between the battery compartment 54 and the LCD display 34 which is operatively connected to the display board 70. To save space, the thickest component of the device, the battery compartment 54, is positioned opposite the display 34 which is a very thin component. In this manner the housing is not overly thick. The display board 70, CPU shields 66, 68, CPU board 64, and main board 62 are separated and held in position by spacers 72 which are necessary for proper operation of the device. A connector 73 extends perpendicular to the CPU board 64 and main board 62 and connects to the bottoms of the main and CPU boards.

The mouth piece 38 is positioned near the bottom 48 on the audio face 26 and has at least one opening 74. A mic boot 76, with a central opening 78 in communication with the mouth piece opening 74, extends into the housing 22, and holds a microphone 80 which is operatively connected to the CPU board 64. Because the main input area 30 of the keypad 28 extends from the bottom 48 of the housing 22 up to the display 34, the length L of the housing would have to be extended or a hinged flap would have to be attached to the bottom 48 of the housing 22 to place the microphone 80 on the control face 24. A hinged flap would undesirably complicate the device, and lengthening the housing makes the device less ergonomic, heavier, and bulkier to use. Therefore, positioning the mouth piece 38 opposite the keypad 28 on the audio face 26 instead of the control face 24 allows the device to be constructed with the housing 22 having a minimum length L.

A GPS board 82 is held between the inner front case 61 and the rear case 42 near the top 46 of the housing 22. The GPS board 82 is operatively connected to both the CPU board 64 and the main board 62. Both a GPS patch antenna 84 and a telephone antenna 86 (FIG. 3) are operatively connected to the GPS board 82 for receiving and transmitting signals. The GPS board 82 preferably extends through the housing at angle relative to the length L of the housing 22. The angle of the GPS board 82 causes the GPS board to generally follow the path of the curve 60 of the housing 22. The angle of board 82 also positions the patch antenna 84 in a better orientation to receive satellites while either being held in front or up to one's face during a cellular call. Thus, a bottom 88 of the GPS board 82 is near the control face 24, and a top 90 of the GPS board 82 is farther away from the control face 24. The GPS patch antenna 84 is placed on the GPS board 82 toward the control face 24 with a GPS antenna mount 91, and the wireless antenna 86, preferably a cellular antenna, is connected to the GPS board 82 through the top 46 of the housing 22 with an antenna mount 92 (FIG. 3).

A speaker 94 and a ringer 96 are mounted inside the housing 22 adjacent the ear piece 36 and opposite the GPS patch antenna 84. The ear piece has at least one opening 93 for the transmission of sound. Both the speaker 94 and ringer 96 are operatively connected to the CPU board 64. By angling the GPS board 82, it does not extend as far upward, and thus, the housing 22 can be shortened. Further, angling the GPS board 82 from front to rear in the direction of the curve 60 as shown in FIG. 4, leaves room for the battery pack latching mechanism 55 on the audio face 26 without increasing the length L of the housing 22. The angled GPS board 82 also leaves space for the GPS patch antenna 84 between the GPS board and the inner front case 61 without increasing the length L of the housing 22. Still further, with the speaker 94 and ringer 96 positioned on the audio face 26 opposite the GPS patch antenna 84, the housing does not need to be lengthened to place them on the control face 24. Thus, the housing preferably has a length no greater than 7 inches, and with both the ear piece and mouth piece positioned on the audio face 26 opposite the keypad and display, the spacing between the ear and mouth pieces can be optimized for the largest population of users. Preferably the ear piece is approximately 5.5 inches from the mouth piece.

Thus, an ergonomic hand held combined global positioning wireless telephone device is disclosed which utilizes a unique arrangement of components to minimize the size of the device and enhance its ergonomic and hand held features. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. An ergonomic hand held combined global positioning wireless telephone device having a length, the device comprising:

a housing including at least one side, a top, a bottom, a control face, and an audio face substantially opposite the control face;

an ear piece positioned on the housing;

a mouth piece positioned on the housing and spaced apart form the ear piece;

at least one of the ear piece and the mouth piece being positioned on the audio face;

an input pad positioned on the control face;

a display positioned on one of the control face and the audio face;

a speaker held in the housing adjacent the ear piece;

a ringer held in the housing adjacent the speaker and the ear piece;

a microphone held in the housing adjacent the mouth piece, whereby the length of the device is minimized; and a GPS board held inside the housing adjacent the control face and the top, a cellular antenna electrically connected to the GPS board and extending from the housing, a GPS patch antenna connected to the GPS board and held in the housing, and wherein the ear piece and the speaker are positioned near the top of the housing and opposite the GPS patch antenna.

2. The device according to claim 1 wherein both the ear piece and the mouth piece are positioned on the audio face whereby the length of the device is minimized.

3. The device according to claim 1 wherein one of the mouth piece and the ear piece is positioned near the bottom of the housing and another of the ear piece and the mouth piece is positioned near the top of the housing.

4. The device according to claim 1 further comprising means for powering the device.

5. The device according to claim 4 wherein the powering means comprises a battery compartment for receiving a battery pack which is removable and positioned on the audio face between the ear piece and the mouthpiece opposite the display.

6. The device according to claim 1 further comprising a means for powering the device, and a GPS board held inside the housing adjacent the control face and the top, and wherein the GPS board is angled with respect to the length of the housing to minimize the length of the housing, make space for a GPS patch antenna attached to the GPS board, and make space for a latching mechanism for access to the powering means whereby the angled mounting aids reception of said GPS patch antenna when said device is held to a user's face or held in front of the user.

7. An ergonomic hand held combined global positioning wireless telephone device having a length, the device comprising:

a housing including: a control face; an audio face substantially opposite the control face; at least one side, a top, and a bottom separating the control face from the audio face; and an antenna mount on the top of the housing;

a telephone antenna received in the antenna mount;

an ear piece positioned on the audio face and near the top;

a mouth piece positioned on the audio face and near the bottom being spaced apart form the ear piece;

a battery compartment for receiving a battery pack and being removable and positioned on the audio face between the ear piece and the mouth piece;

a main input pad positioned on the control face near the bottom and opposite the mouth piece;

a secondary input pad positioned on the control face near the top;

a display positioned on the control face between the main input pad and the secondary input pad opposite the battery compartment;

a speaker held in the housing adjacent the ear piece;

a ringer held in the housing adjacent the speaker and the ear piece; and a microphone held in the housing adjacent the mouth piece;

a GPS board electrically connected to the telephone antenna and held inside the housing adjacent the control face and adjacent the top;

a GPS patch antenna connected to the GPS board opposite the speaker and ear piece;

a CPU board held in the housing near the bottom between the main input pad and the mouth piece; and a main board adjacent the CPU board and between the main input pad and the mouth piece whereby the length of the device is minimized.

8. The device according to claim 7 wherein the GPS board is angled with respect to the length.

9. An ergonomic hand held electronic device having a size, the device comprising:

a housing including at least one side, a top, a bottom, a control face, and an audio face substantially opposite the control face;

a global positioning system held in the housing and including an input pad positioned on the control face and a display positioned on one of the control face and the audio face;

a wireless telephone system held in the housing and including the input pad positioned on the control face, the display positioned on one of the control face and the audio face, an ear piece positioned on the audio face, a speaker adjacent the ear piece, a mouth piece positioned on the audio face and spaced apart from the ear piece, and a microphone adjacent the mouth piece whereby the size is minimized; and the global positioning system further includes a GPS board held inside the housing adjacent the control face and the top, an antenna mount on the GPS board, and a GPS patch antenna electrically connected to the GPS board at the antenna mount; and wherein the ear piece and the speaker are positioned near the top of the housing opposite the GPS patch antenna.

10. The device according to claim 9 wherein the GPS board is angled relative to a length of the housing to reduce said length and to make space for the GPS patch antenna and a battery compartment latching mechanism, whereby the angled mounting aids reception of said GPS patch antenna when said device is held to a user's face or held in front of the user.

11. An ergonomic hand held combined global positioning wireless telephone device having a length, the device comprising:

a housing including at least one side, a top, a bottom, a control face, and an audio face substantially opposite the control face;

an ear piece positioned on the housing;

a mouth piece positioned on the housing and spaced apart form the ear piece;

at least one of the ear piece and the mouth piece being positioned on the audio face;

an input pad positioned on the control face;

a display positioned on one of the control face and the audio face;

a speaker held in the housing adjacent the ear piece;

a ringer held in the housing adjacent the speaker and the ear piece;

a microphone held in the housing adjacent the mouth piece, whereby the length of the device is minimized; and a means for powering the device, and a GPS board held inside the housing adjacent the control face and the top, and wherein the GPS board is angled with respect to the length of the housing to minimize the length of the housing, make space for a GPS patch antenna attached to the GPS board, and make space for a latching mechanism for access to the powering means whereby the angled mounting aids reception of said GPS patch antenna when said device is held to a user's face or held in front of the user.

12. The device according to claim 11 wherein both the ear piece and the mouth piece are positioned on the audio face whereby the length of the device is minimized.

13. The device according to claim 11 wherein one of the mouthpiece and the ear piece is positioned near the bottom of the housing and another of the ear piece and the mouth piece is positioned near the top of the housing.

14. The device according to claim 11 further comprising means for powering the device.

15. An ergonomic hand held electronic device having a size, the device comprising:

a housing including at least one side, a top, a bottom, a control face, and an audio face substantially opposite the control face;

a global positioning system held in the housing and including an input pad positioned on the control face and a display positioned on one of the control face and the audio face;

a wireless telephone system held in the housing and including the input pad positioned on the control face, the display positioned on one of the control face and the audio face, an ear piece positioned on the audio face, a speaker adjacent the ear piece, a mouth piece positioned on the audio face and spaced apart from the ear piece, and a microphone adjacent the mouth piece whereby the size is minimized;

wherein the global positioning system further includes a GPS board held inside the housing adjacent the control face and the top, an antenna mount on the GPS board, and a GPS patch antenna electrically connected to the GPS board at the antenna mount; and wherein the ear piece and the speaker are positioned near the top of the housing opposite the GPS patch antenna; and wherein the GPS board is angled relative to a length of the housing to reduce said length and to make space for the GPS patch antenna and a battery compartment latching mechanism, whereby the angled mounting aids reception of said GPS patch antenna when said device is held to a user's face or held in front of the user.

* * * * *